United States Patent [19]

Washizawa et al.

[11] 3,992,029
[45] Nov. 16, 1976

[54] SKATER TYPE SPORT VEHICLE

[75] Inventors: Yoshikazu Washizawa, Omiya; Kiyoshi Kume, Saitama; Yasuhiro Ohba, Niiza; Kazutoshi Otsuka, Wako, all of Japan

[73] Assignee: Honda Giken Kogyo Kabushiki Kaisha, Tokyo, Japan

[22] Filed: July 21, 1975

[21] Appl. No.: 597,886

[30] Foreign Application Priority Data

Sept. 4, 1974  Japan............................ 49-100838

[52] U.S. Cl.......................... 280/221; 280/87.04 R; 280/88; 280/255
[51] Int. Cl.² ...................... B62M 1/04; B62K 9/00
[58] Field of Search .......... 280/220, 221, 253, 255, 280/258, 251, 87.04 R, 87.04 A, 87.04 B, 267, 268, 11.28, 88

[56] References Cited
UNITED STATES PATENTS

| | | | |
|---|---|---|---|
| 2,027,254 | 1/1936 | Vogt | 280/87.04 R |
| 2,330,147 | 9/1943 | Rodriquez | 280/87.04 R |
| 2,429,678 | 10/1947 | Fuller | 280/11.28 |
| 3,175,844 | 3/1965 | Whitehouse | 280/221 |
| 3,180,656 | 4/1965 | Gruenstein | 280/255 |

Primary Examiner—Kenneth H. Betts
Attorney, Agent, or Firm—Haseltine, Lake & Waters

[57] ABSTRACT

A sport vehicle comprising a vehicle frame having a step on its upper surface and an upstanding handle rod at its front end. At the lower surface of the front of the frame a front wheel axle is mounted having a pair of front wheels at its ends, the middle portion of the axle being rotatably supported through a steering shaft having a negative caster angle, the vehicle frame and the front wheel axle being interconnected through a resilient member. A single rear wheel is mounted on the vehicle frame at the lower surface of the rear portion thereof. One of the three wheels can be a driving vehicle wheel in which case a pedal lever is swingably mounted on the frame for upwards and downwards movement to drive a longitudinally extending flexible member for reciprocation in forwardly and rearwardly direction. A sprocket or the like is in engagement with the flexible member and is drivingly connected to the vehicle drive wheel through a free wheel clutch so that the vehicle drive wheel is driven only in regular direction of rotation of the sprocket and the vehicle body frame, and the connecting rod is so constructed that the same may serve also as stopper member for limiting the upward and downward movements of the pedal lever.

5 Claims, 9 Drawing Figures

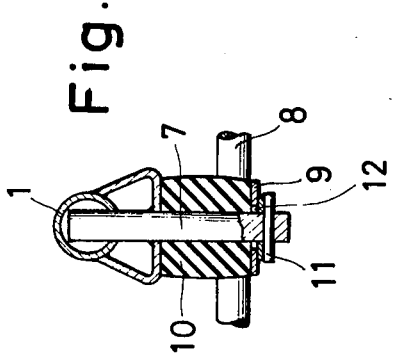
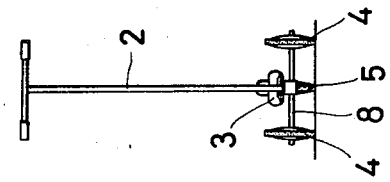
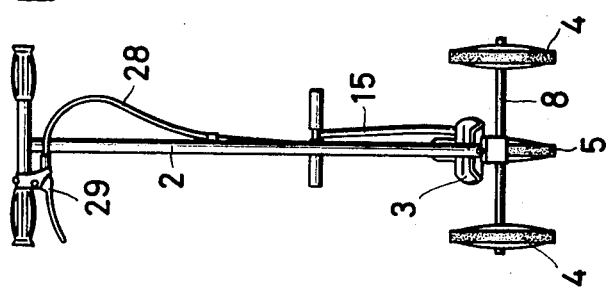
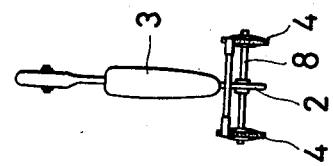
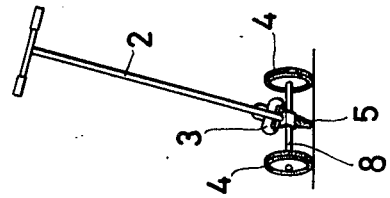
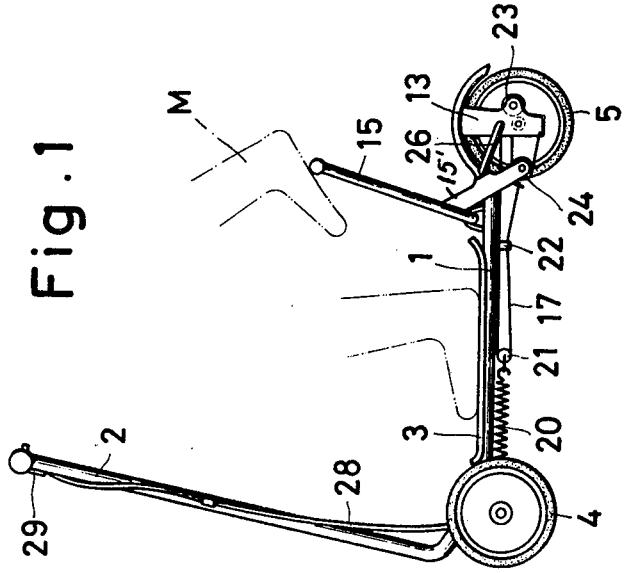
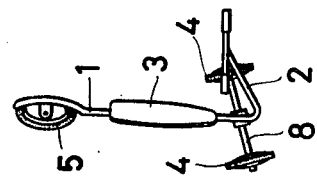

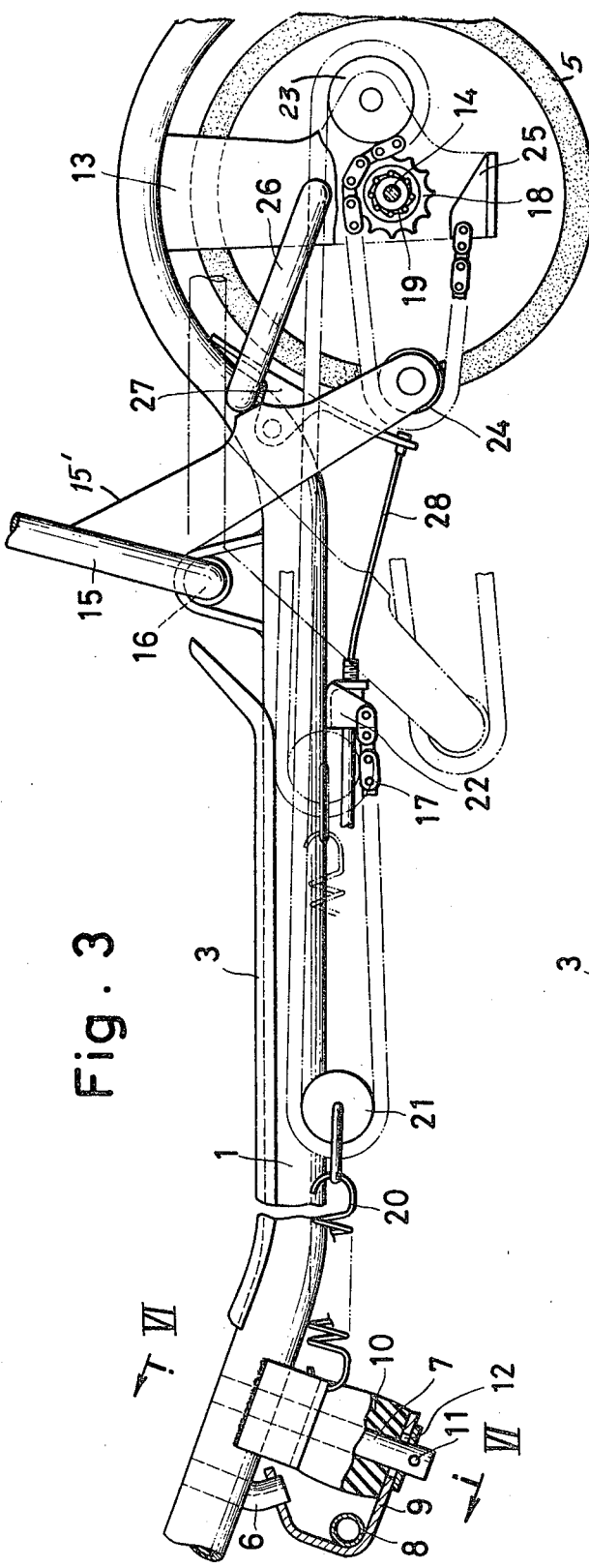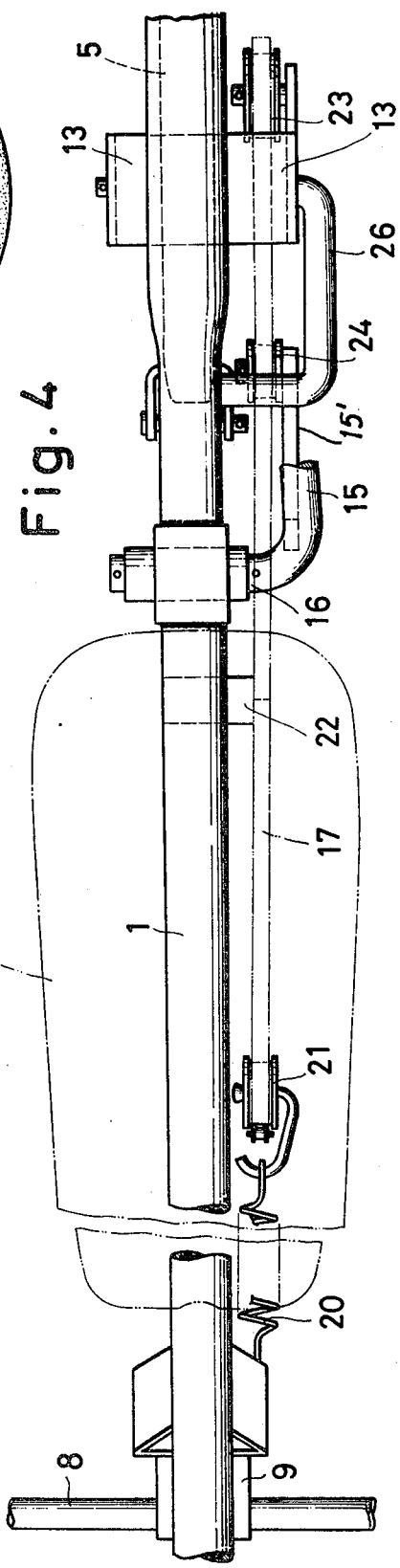

SKATER TYPE SPORT VEHICLE

FIELD OF THE INVENTION

This invention relates to a vehicle for sport or play of skater type having a pair of left and right front wheels and a single rear wheel.

SUMMARY OF THE INVENTION

An object of the invention is to provide a vehicle of the above type in which steering can be effected by transfer of weight to the right or left of a driver standing on a step of the vehicle.

According to the invention, there is provided a vehicle frame having a step and at its front end, an upstanding handle thereon, a front axle at the front lower surface of the frame carrying a pair of left and right wheels in such a manner that the middle portion of the axle is rotatably supported by the frame through a steering shaft having a negative caster angle, the vehicle frame and the front wheel axle being interconnected through a resilient member, the vehicle frame being additionally provided at its rear with a single rear wheel.

In further accordance with the invention, at least one of the three wheels is a driving wheel, and the vehicle frame is provided with a pedal lever which is swingable upwardly and downwardly to operate a longitudinal flexible member such as a chain, a rope or the like for reciprocation in the front and rear directions according to the upward and downward movements of the pedal lever. A drive wheel such as a chain sprocket or the like is engaged with the flexible member, and the drive wheel is connected to the vehicle driving wheel through a free wheel clutch so that the vehicle driving wheel can be driven only in the regular direction of rotation of the drive wheel.

Furthermore, according to the invention, the vehicle frame is provided with at least one bracket for pivotally supporting the vehicle driving wheel, and a connecting rod serving for reinforcement is connected between the bracket and the frame, the connecting rod being positioned to serve also as a stop member limiting the upwards and downwards movements of the pedal lever.

BRIEF DESCRIPTION OF THE DRAWING

FIG. 1 is a side view of one embodiment of a vehicle according to this invention;

FIG. 2 is a front view thereof,

FIG. 3 is an enlarged side view, partly in section, of a main portion of the vehicle, FIG. 4 is a top plan view of the portion of FIG. 3;

FIG. 5 is a sectional view taken along line VI—VI in FIG. 3, and

FIG. 6 is a top plan view of the vehicle in left turning condition,

FIG. 7 is a front view of the vehicle in left turning condition,

FIG. 8 is a top plan view of the vehicle in stopped or straight running condition, and FIG. 9 is a front view of the vehicle in stopped or straight running condition.

DETAILED DESCRIPTION

Referring to the drawings, numeral 1 denotes a vehicle frame made of a single pipe provided at its front end with a T-shaped handle rod 2 extending upwards therefrom and at its upper surface with a plate-like step 3 attached thereto. Suspended on the lower surface of the vehicle frame 1 is a pair of front wheels 4, and a single rear wheel 5. The mounting of the wheels on the frame will next be described in detail.

Fixedly secured at the lower surface of frame 1 at the front thereof is a downwardly projecting steering shaft 6 having a negative caster angle and a longer suspension shaft 7 is fixed to the frame 1 behind the steering shaft. An L-shaped bracket 9 is fixedly secured to the middle of a front axle 8 carrying the front wheels 4 at both its ends. The bracket 9 is rotatably supported at its upper end on the steering shaft 6, and is connected at its rear end to the suspension shaft 7 by means of a pin 11 with a resilient member 10 held therebetween. An opening 12 is provided in the bracket 9 for loosely receiving the suspension shaft 7 such that the bracket 9 can freely turn about the shaft 7. The axis of the steering shaft extends through the center of opening 12.

Secured to the vehicle frame 1 at the lower surface of the rear portion thereof is a pair of left and right brackets 13 and these brackets 13 serve to support the opposite ends of a rear axle 14. The rear wheel 5 is mounted on the middle portion of the axle 14.

The operation of the vehicle will next be described as follows:

This vehicle is used chiefly on a ground surface having a gentle descending slope or a nearly horizontal surface. In use, a driver M gets on the step 3 in a standing position while gripping the handle portions at the top of rod 2. Then, when the vehicle descends the slope by the action of its own weight or of a drive apparatus thereon (to be described later), if the driver M applies his weight, for example, to the left side of the step 3, the resilient member 10 is compressed at its left side and the vehicle frame 1 is inclined to the left as shown in FIG. 7, and in accordance therewith the front axle 8 is turned to the left as shown in FIG. 6, about the steering shaft 6 along with the bracket 9. Accordingly, the vehicle can be turned to the right if the driver transfers his weight to the right side of the step 3.

When the vehicle is stopped or is traveling straight ahead at a low speed, the vehicle frame 1 and accordingly the step 3 is automatically urged to horizontal position by the resilient member 10 as shown in FIGS. 8 and 9.

According to this invention, as described above, it is interesting because the steering of the vehicle can be controlled in such a manner that the driver who is on the step transfers his weight to the right and the left. Further, since the front axle having the pair of left and right front wheels is connected to the vehicle body frame through the resilient member, the vehicle frame can provide an automatic restoring property, and therefore there is no fear of falling of the vehicle even on stopping or traveling at low speed in a straight line. Furthermore, the handle rod on the vehicle frame at its front end allows the driver to easily control his driving posture and not only can a beginner have stable steering and straight running postures but also, in the case of getting off for any reason, such damage that would be caused by unmanned running or falling of the vehicle can be prevented by the driver holding the handle rod.

An apparatus for driving of the vehicle will now be described hereafter.

In the illustrated embodiment, the rear wheel 5 is selected to be a driving wheel driven in rotation by a pedal lever 15 mounted on the vehicle body frame 1. The pedal lever 15 is mounted on the rear portion of the vehicle frame 1 through a middle portion of a shaft 16 so as to be swingable upwardly and downwardly, and thus can be pushed rearwards and downwards by a pedaling operation of the driver. Mounted below the lever 15 is a longitudinally extending flexible member comprising a chain 17 extending substantially along the lower surface of the vehicle frame 1 and to be given forward and rearward movements by the upward and downward oscillatory or swinging movements of the pedal lever 15. A sprocket 18 serving as a drive wheel, is in engagement with the chain 17 and is attached to the axle 14 of the wheel 5 through a free wheel clutch 19 such that if the chain 17 is reciprocated in the front and rear directions by the swinging movements of the lever 15, the wheel 5 is driven in rotation in one direction only, that is, the regular direction of rotation through the sprocket 18 and the free wheel 19. In greater detail, a guide wheel 21 which can be displaced against the action of a spring 20 is provided on the lower side of the front portion of the vehicle frame 1, and the chain 17 is wound around the guide wheel 21 and is secured at one terminal end to the lower surface of the vehicle frame 1 through a terminal member 22. The rear portion of the chain 17 is wound around a stationary guide wheel 23 mounted on the rear portion of the vehicle frame 1 and the chain passes over the upper surface of the sprocket 18 and around an operation guide wheel 24 mounted on an arm 15' fixed to the lower end of the lever 15, and the other terminal end is secured to the lower surface of the vehicle frame 1 through a terminal member 25. Thereby, if the guide wheel 24 is moved forwards by downward movement of the lever 15, the chain 17 is retracted along with the guide wheel 21 against the action of the spring 20 and thereby the sprocket 18 is driven in rotation in one direction. If, then, the lever 15 is released from the downward pressure, the chain 17 is moved forwards by the action of the spring 20 through the guide wheel 21, whereby the sprocket 18 is driven in rotation in the other direction. If this is repeated, the wheel 5 is driven in rotation in one direction nearly continuously and thereby the vehicle frame 1 is driven forwardly.

As mentioned before, the rear axle 14 is supported at both ends by the pair of left and right brackets 13 projecting from the rear portion of the vehicle frame 1. A U-shaped connecting rod 26 is connected between one of the brackets 13 and the vehicle frame 1 so as to serve as a reinforcement for the attachment of the bracket 13. Additionally, the front end of the connecting rod 26 is intended to serve as a limiting or stop member for limiting the upward and downward swinging movements of the lever 15. Namely, at the time of downward swinging movement of the lever 15, the lever strikes against the rod 26 at its lower limit position and at the time of upward swinging movement the arm 15' strikes against rod 26 at the upper limit position. FIG. 3 shows the upper and lower limit positions of the lever and arm respectively in solid and chain dotted lines. Numeral 27 denotes a brake shoe facing the front surface of the wheel 5, and the brake shoe is connected through a brake cable 28 to a brake lever 29 provided on the top of the handle rod 2.

The operation of the vehicle with the drive means is effected as follows:

The driver effects a repeated stepping operation on the pedal lever 15 to push the lever rearwards and downwards, and the chain 17 is alternately advanced by being pushed by the lever 15 through the operation guide wheel 24 and then the chain is retreated by being pulled by the spring 20 through the guide wheel 21. Thereby the sprocket 18 is driven in a regular direction of rotation and in a reverse direction of rotation repeatedly, and only in the regular direction of rotation is drive force transmitted to the wheel 5 from the axle 14 through the free wheel clutch 19. Thereby the wheel 5 is rotated only in the regular direction, and thus the vehicle frame 1 is forwardly advanced. During this operation, the lever 15 is repeatedly moved downwards by the stepping action of the driver and the upward movement of the lever is effected by the action of the spring 20. These movements are limited within a predetermined angular range by the connecting rod 26.

Thus, according to the invention, oscillating movements of the pedal lever 15 are converted into reciprocating forward and rearward movements of the chain 17 so as to drive the vehicle wheel 5, so that the drive assembly can be comparatively small in size and light in weight in comparison with a conventional one using, for instance, a gear mechanism. Additionally, according to this invention, the connecting rod 26 serving for reinforcement of the bracket 13 for the wheel also serves as a stop member for the movement of the lever 15 and avoids the need for a separate stop element.

What is claimed is:

1. A sport vehicle comprising a frame having front and rear ends, an upstanding handle on said frame at the front end thereof, a front axle, a pair of spaced front wheels on said front axle, steering means for pivoting said front axle including a steering shaft on said frame supporting said axle at a location intermediate the front wheels for left and right pivotal steering movement, said steering shaft having a negative caster angle, and a resilient member interconnecting the front axle and said frame such that tilting of said frame produces pivotal steering movement of said axle, a rear axle rotatably mounted from said frame at the rear end thereof, a rear support wheel on said rear axle, driving means for driving one of said wheels in rotation by repeated foot action of the operator, said driving means comprising a swingable pedal lever, a drive wheel for said one wheel to be driven in rotation, a flexible member coupled to said pedal lever to be driven in reciprocating movement upon oscillating swinging of said pedal lever and means for transmitting drive rotation force from said drive wheel to the vehicle wheel to be driven in rotation for one direction of movement of said longitudinal member while allowing idle movement in the opposite direction, a support element secured to said frame and rotatably supporting the axle of said one wheel of the vehicle to be driven in rotation, and a connecting rod secured to said support element and to said frame and positioned relative to said pedal lever to serve as a stop member limiting oscillating swinging movement of said pedal lever in two directions.

2. A sport vehicle comprising a frame having front and rear ends, an upstanding handle on said frame at the front end thereof, a front axle, a pair of spaced front wheels on said front axle, steering means for pivoting said front axle including a steering shaft on said frame supporting said axle at a location intermediate the front wheels for left and right pivotal steering movement, said steering shaft having a negative caster angle, and a resilient member interconnecting the front axle and said frame such that tilting of said frame produces pivotal steering movement of said axle, a rear axle rotatably mounted from said frame at the rear end thereof, a rear support wheel on said rear axle, driving means for driving one of said wheels in rotation by repeated foot action of the operator, said driving means comprising a swingable pedal lever, a drive wheel for said one wheel to be driven in rotation, a flexible member coupled to said pedal lever to be driven in reciprocating movement upon oscillating swinging of said pedal lever and means for transmitting drive rotation force from said drive wheel to the vehicle wheel to be driven in rotation for one direction of movement of said longitudinal member while allowing idle movement in the opposite direction, said drive wheel being a sprocket and said drive member a chain in mesh with said sprocket, said driving means further comprising yieldable displaceable supports on said frame supporting said chain.

3. A sport vehicle as claimed in claim 2 comprising a step on said frame.

4. A sport vehicle as claimed in claim 3 wherein said steering means further comprises a suspension shaft mounted on said frame, a bracket secured to said front axle and rotatably supported on said steering shaft, said resilient member being interengaged between said frame and bracket, said bracket being rotatably coupled to said suspension shaft.

5. A sport vehicle as claimed in claim 1 wherein said yieldable displaceable supports comprise a pair of guide wheels around which said chain is wound, and spring means connecting one of said guide wheels to said frame.

* * * * *